(12) United States Patent
Westerweck

(10) Patent No.: US 7,798,730 B2
(45) Date of Patent: Sep. 21, 2010

(54) CAMERA BLADE SHUTTER MODULE

(75) Inventor: Lothar Westerweck, San Jose, CA (US)

(73) Assignee: Flextronics AP, LLC, Broomfield, CO (US)

( * ) Notice: Subject to any disclaimer, the term of this patent is extended or adjusted under 35 U.S.C. 154(b) by 266 days.

(21) Appl. No.: 12/150,219

(22) Filed: Apr. 25, 2008

(65) Prior Publication Data

US 2008/0279544 A1 Nov. 13, 2008

Related U.S. Application Data

(60) Provisional application No. 60/928,135, filed on May 7, 2007.

(51) Int. Cl.
*G03B 9/10* (2006.01)
(52) U.S. Cl. ....................... 396/493; 396/510
(58) Field of Classification Search ............... 396/463, 396/505–510, 467, 471, 493–494, 497–501
See application file for complete search history.

(56) References Cited

U.S. PATENT DOCUMENTS

| | | | |
|---|---|---|---|
| 2,279,372 A | 4/1942 | Herzberger | 88/57 |
| 3,087,384 A | 4/1963 | Baur et al. | 88/57 |
| 3,599,377 A | 8/1971 | Dartnell | 51/284 |
| 3,609,270 A | 9/1971 | Jorgensen et al. | 200/67 |
| 4,257,086 A * | 3/1981 | Gulliksen | 362/279 |
| 4,879,592 A | 11/1989 | Ernest | 358/42 |
| 5,016,993 A | 5/1991 | Akitake | 350/429 |
| 5,095,204 A | 3/1992 | Novini | 250/223 B |
| 5,177,638 A | 1/1993 | Emura et al. | 359/704 |
| 5,196,963 A | 3/1993 | Sato et al. | 359/699 |
| 5,272,567 A | 12/1993 | Inoue | 359/699 |
| 5,546,147 A | 8/1996 | Baxter et al. | 354/187 |
| 5,689,746 A * | 11/1997 | Akada et al. | 396/508 |
| 5,754,210 A | 5/1998 | Haneda et al. | 347/116 |

(Continued)

FOREIGN PATENT DOCUMENTS

EP 1148406 A2 10/2001

(Continued)

OTHER PUBLICATIONS

Office Action regarding Chinese Patent Application No. 200680041383.0, Application Date: Sep. 5, 2006, date of Office Action: Dec. 18, 2009, 8 pages.

(Continued)

*Primary Examiner*—W. B. Perkey
*Assistant Examiner*—Dennis Hancock
(74) *Attorney, Agent, or Firm*—Haverstock & Owens LLP

(57) ABSTRACT

The present invention is a miniature camera shutter module for use in miniature camera applications. It is an object of the present invention to provide the miniature camera shutter module with solenoid controlled blades in order to alter the amount and quality of light passing through a conduit disposed on the surface of the module. In some embodiments of the present invention, the blade comprises a shutter to completely block light. In other embodiments, the blade comprises an aperture, a neutral-density filter, a monochromatic filter, and the like. In some embodiments of the present invention, the miniature camera shutter module is positioned within a more elaborate miniature camera chassis.

34 Claims, 11 Drawing Sheets

U.S. PATENT DOCUMENTS

| | | | |
|---|---|---|---|
| 5,805,362 A | 9/1998 | Hayes | 359/819 |
| 5,835,208 A | 11/1998 | Hollmann et al. | 356/124 |
| 5,926,965 A | 7/1999 | Shijo et al. | 33/390 |
| 5,954,192 A | 9/1999 | Iitsuka | 200/336 |
| 5,966,248 A | 10/1999 | Kurokawa et al. | 359/697 |
| 6,091,902 A | 7/2000 | Komatsuzaki et al. | 396/60 |
| 6,292,306 B1 | 9/2001 | Betensky | 359/663 |
| 6,330,400 B1 | 12/2001 | Bittner et al. | 396/72 |
| 6,417,601 B1 | 7/2002 | Kim | 310/333 |
| 6,530,703 B2 * | 3/2003 | Nakano et al. | 396/456 |
| 6,597,516 B2 | 7/2003 | Saitoh et al. | 359/694 |
| 6,760,167 B2 | 7/2004 | Meehan et al. | 359/822 |
| 6,762,888 B1 | 7/2004 | Oshima | 359/696 |
| 6,805,499 B2 | 10/2004 | Westerweck et al. | 396/448 |
| 6,869,233 B2 | 3/2005 | Westerweck et al. | 396/460 |
| 6,940,209 B2 | 9/2005 | Henderson | 310/323.02 |
| 7,088,525 B2 | 8/2006 | Finizio et al. | 359/703 |
| 7,156,564 B2 * | 1/2007 | Watanabe et al. | 396/463 |
| 7,193,793 B2 | 3/2007 | Murakami et al. | 359/791 |
| 7,301,712 B2 | 11/2007 | Kamo | 359/785 |
| 7,330,648 B2 | 2/2008 | Morinaga et al. | 396/144 |
| 7,394,602 B2 | 7/2008 | Chen et al. | 359/785 |
| 7,400,454 B2 | 7/2008 | Kubota et al. | 359/689 |
| 7,420,609 B2 | 9/2008 | Yamaguchi et al. | 348/335 |
| 2002/0018140 A1 | 2/2002 | Suemoto et al. | 348/358 |
| 2002/0102946 A1 | 8/2002 | SanGiovanni | 455/90 |
| 2002/0136556 A1 * | 9/2002 | Nomura et al. | 396/458 |
| 2003/0174419 A1 | 9/2003 | Kindler et al. | 359/819 |
| 2004/0042780 A1 * | 3/2004 | Kindaichi et al. | 396/112 |
| 2004/0042785 A1 * | 3/2004 | Watanabe et al. | 396/463 |
| 2004/0042786 A1 * | 3/2004 | Watanabe et al. | 396/463 |
| 2004/0056970 A1 | 3/2004 | Westerweck et al. | 348/240.3 |
| 2004/0056974 A1 | 3/2004 | Kitajima et al. | |
| 2004/0203532 A1 | 10/2004 | Mizuta | 455/90.3 |
| 2004/0258405 A1 | 12/2004 | Shiratori et al. | 396/458 |
| 2005/0063698 A1 | 3/2005 | Usuda et al. | |
| 2005/0157195 A1 | 7/2005 | Ohashi et al. | |
| 2005/0264670 A1 | 12/2005 | Yamaguchi et al. | 348/335 |
| 2006/0049720 A1 | 3/2006 | Henderson et al. | 310/328 |
| 2006/0056389 A1 | 3/2006 | Monk et al. | 370/352 |
| 2006/0083503 A1 | 4/2006 | Fukai | |
| 2006/0113867 A1 | 6/2006 | Sakatani et al. | 310/323.17 |
| 2006/0124746 A1 | 6/2006 | Kim et al. | |
| 2006/0291061 A1 | 12/2006 | Iyama et al. | 359/614 |
| 2007/0053672 A1 | 3/2007 | Westerweck et al. | |
| 2007/0074966 A1 | 4/2007 | Yamamoto et al. | 200/547 |
| 2007/0077051 A1 | 4/2007 | Toor et al. | 396/144 |
| 2007/0077052 A1 | 4/2007 | Chang | 396/144 |
| 2007/0086777 A1 | 4/2007 | Fujita | 396/452 |
| 2007/0122146 A1 | 5/2007 | Ryu | 396/529 |
| 2007/0201866 A1 * | 8/2007 | Kihara | 396/468 |

FOREIGN PATENT DOCUMENTS

| | | |
|---|---|---|
| EP | 1148406 A3 | 6/2002 |
| EP | 1357726 A1 | 10/2003 |
| GB | 1378515 A | 12/1974 |
| GB | 2315186 A | 1/1998 |
| GB | 2387063 A | 10/2003 |
| JP | 02123335 A * | 5/1990 |
| JP | 11-72678 | 3/1999 |
| JP | 2002-286987 | 10/2002 |

OTHER PUBLICATIONS

"High Precision Optical Assembly Starts Here," (4 pages) 1996, Opto-Alignment Technology, Inc.

Non-Final Office Action dated Jun. 11, 2009, U.S. Appl. No. 12/287,469, filed Oct. 8, 2008, Westerweck, Lothar.

Office Action mailed Mar. 30, 2010, U.S. Appl. No. 12/150,874, 26 pages.

* cited by examiner

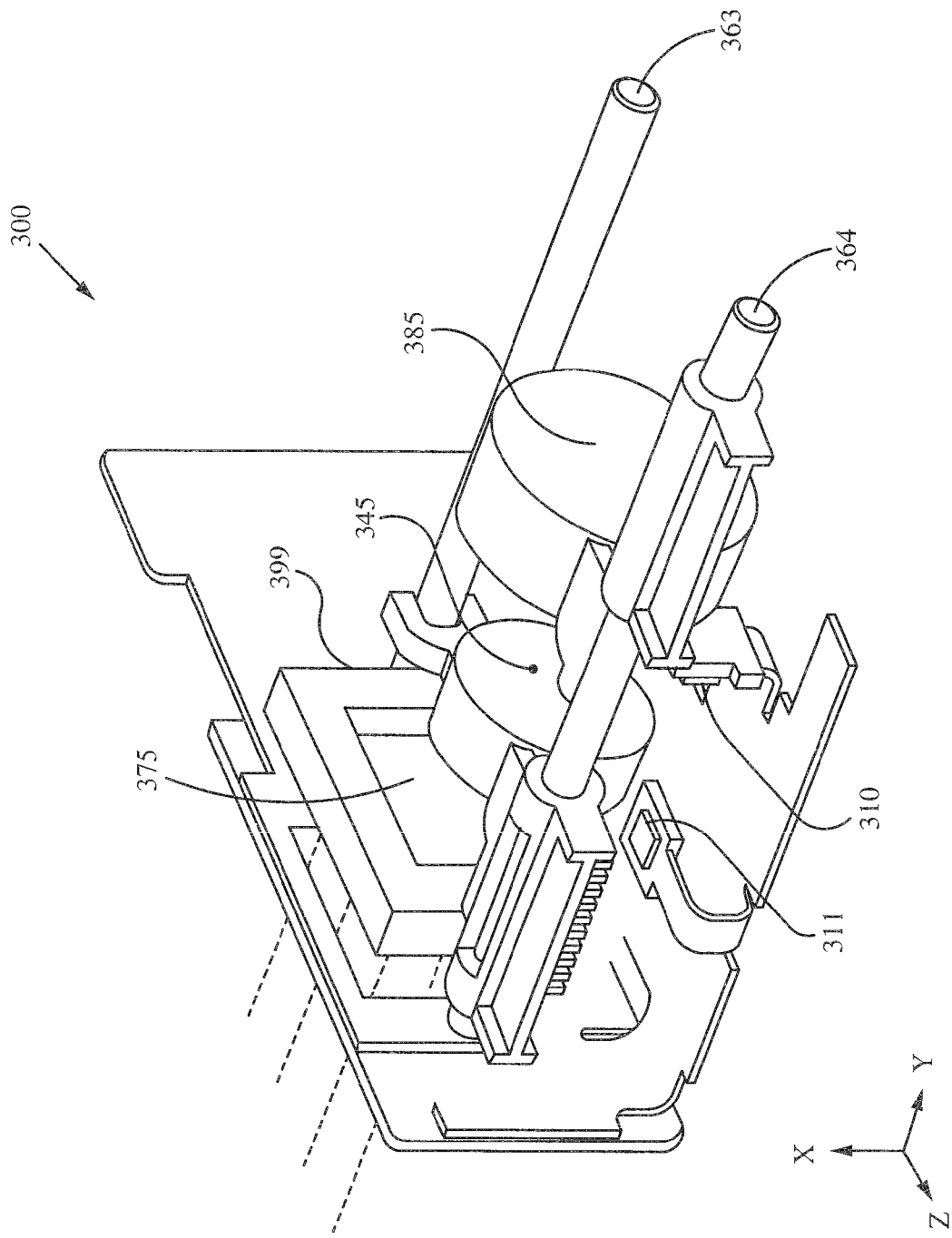

CAMERA BLADE SHUTTER MODULE

RELATED APPLICATIONS

This Patent Application claims priority under 35 U.S.C. §119 (e) of the U.S. Provisional Patent Application, Ser. No. 60/928,135, filed May 7, 2007, and entitled, "MINIATURE CAMERA SHUTTER AND FILTER/APERTURE". The Provisional Patent Application, Ser. No. 60/928,135, filed May 7, 2007, and entitled, "MINIATURE CAMERA SHUTTER AND FILTER/APERTURE" is also hereby incorporated by reference in its entirety.

FIELD OF THE INVENTION

The present invention relates generally to the field of image capture systems. More specifically, the present invention relates to shuttering, adjusting aperture size and filtering optical exposures in a camera system having restrictive size limitations.

BACKGROUND OF THE DISCLOSURE

For the purpose of this application, unless otherwise indicated expressly or impliedly by the context of the description, the term "conduit" shall mean an opening in a camera shutter module designed to allow the passage of light therethrough. Likewise, the term "aperture" shall mean an apparatus for allowing less than 100% of an amount of light through a conduit.

Also, the terms "camera shutter module" and "miniature camera shutter module" shall mean an apparatus incorporated within a camera optics system used to affect the amount and/or quality of light passing through the optics system to an imaging surface whether or not the apparatus is configured for shuttering light. For example, a miniature camera shutter module may refer to an apparatus configured for shuttering light, or for an apparatus configured for affecting the amount and/or quality of light without actually shuttering light. Of course, a miniature camera shutter module may also refer to an apparatus configured for shuttering, filtering and for providing an aperture for light in a camera optics system.

Cameras commonly include mechanical structures for shuttering light, adjusting an amount of light and adjusting the quality of light that is able to pass through a conduit and fall incident upon an imaging surface.

The camera shutter is a device that alternatively allows light to pass through a conduit to an imaging surface for a certain period of time and blocks the light so as to limit the time light falls incident upon the imaging surface. It is advantageous to have the ability to control the shutter speed, or the time the imaging surface is exposed to light. Furthermore, in digital camera applications, it is important to shutter light in order to allow an imaging surface to process an exposure of light.

It is also advantageous to control the percentage of an amount of light that is exposed to an imaging surface. An aperture is a device which can be used to limit the total amount of light able to pass through a conduit onto an imaging surface. For example, a smaller aperture lets less light onto the imaging surface so that bright images may be processed, whereas a larger aperture allows more light onto the imaging surface to expose darker images. It is also advantageous to control the quality of light falling incident upon an imaging surface by utilizing filters. For example, it may be desirable to reduce the intensity of the light passing through to an imaging surface. Neutral density filters reduce light of all relevant wavelengths from entering an imaging surface. Using a neutral density filter allows a user to reduce a portion of light while maintaining a constant aperture setting. Neutral density filters are particularly useful in preventing overexposure during bright conditions. Also, in some instances it is desirable to filter particular wavelengths of light. For example, ultraviolet filters are used to reduce haziness in images created by ultraviolet light. In other camera applications, color filters are used to compensate for the effects of lighting or for contrast enhancement.

Notwithstanding the advantages provided by utilizing shutters, apertures and filters in photography applications, their use has not been adequately utilized in miniature camera applications such as cameras incorporated into cellular phones, personal digital assistant devices, and the like. This is because, it is oftentimes the case that the camera lens chassis of such devices are designed such that it is extremely impracticable to include shutters, apertures and filter modules. For example, digital camera applications typically require the use of sensitive position sensors to track the position of certain components in the optical train and to adjust the system setting as those components move in relation to an image sensor, such as an array of charge-coupled devices (CCD) or a CMOS sensors. In such applications, it is important not to crowd the sensor or else the image will not be processed correctly. Known techniques do not adequately address this problem.

Furthermore, it is often the case that a shutter should be placed as close to the plane of a conduit as possible for calibration and image processing purposes. As such, the problems associated with sensor crowding are not able to be obviated simply by placing a shutter at a more convenient place along an optical train, but at a distance from the conduit.

As explained above, it is difficult to house a module for controlling shutters, apertures and filters, among other components, within a miniature camera chassis. However, the use of these components if oftentimes crucial in camera applications. For example, shutters are required to block light as a imaging sensor processes an exposure. Also, apertures and filters are oftentimes needed to reduce and filter light so that an image does not become overexposed or washed out.

SUMMARY OF THE DISCLOSURE

According to some embodiments of the present invention, a single miniature camera shutter module is designed to fit into a miniature camera chassis, wherein the module gives the user the ability able to control the amount, quality and exposure time of light on an imaging surface in miniature camera applications. In some embodiments of the present invention, the miniature camera shutter module is specifically designed to accommodate particular camera chassis designs. According to these embodiments, the module size and shape, solenoid placement, axis placement, guide orientation, among other design features are custom designed to accommodate the unique chassis.

In some embodiments of the present invention, the miniature camera shutter module comprises a frame with a conduit for the passage of light therethrough. At least one solenoid device is coupled to the frame and is actuated in response to a signal. The solenoid device causes at least one blade to at least partially eclipse the conduit upon actuation of the solenoid. In some embodiments of the present invention, the blade comprises a shutter to completely block light. In other embodiments, the blade comprises an aperture, a neutral-density filter, a monochromatic filter, or the like.

Furthermore, a method of manufacturing a miniature camera shutter module is disclosed which gives the user the ability able to control the amount, quality and exposure time of light on a imaging surface in miniature camera applications.

In some embodiments, a solenoid device disposed on one side of the frame is used to control at least one blade on the same side of the frame as the solenoid. In other embodiments, a solenoid controls at least one blade on the opposite side of the frame. In some embodiments of the present invention, one solenoid controls more than one blade upon actuation. According to these embodiments, the solenoids, pins, guides, etc are precisely placed such that the module does not crowd the other components of a camera chassis (i.e. a position sensor).

In some embodiments of the present invention, the module device comprises a frame with at least one solenoid device displaced on each side wherein each at least one solenoid has the ability to position a blade in front of a conduit.

According to some embodiments of the present invention, a number of shutter blades, aperture blades and filters, among other accessories, are able to be housed and are controllable on a single module frame. In some other embodiments of the present invention, methods of configuring the one or more blades used to shutter, aperture or filter light with a unique geometry in order to accomplish design goals are disclosed. For example, in some embodiments of the present invention, solenoid is configured to actuate a blade about an axle, wherein the axle is positioned very close to the conduit, allowing the module to be more compact.

According to these embodiments, a user is able to control the amount, quality and exposure time of light on a imaging surface in miniature camera applications. In some embodiments of the present invention, the miniature camera shutter module is positioned within the chassis of a cellular telephone having image recording capabilities or within other common consumer electronic devices now known or those developed in the future.

BRIEF DESCRIPTION OF THE DRAWINGS

FIG. 3A illustrates a schematic isometric view of an alternative miniature camera chassis with an alternative miniature camera shutter module according to some embodiments of the present invention.

DETAILED DESCRIPTION OF THE DISCLOSURE

Disclosed is an improved apparatus as well as improved techniques used for shuttering, adjusting aperture size and filtering light in a miniature camera apparatus. Also disclosed are methods of manufacturing the same. Those of ordinary skill in the art will realize that the following detailed description of the present invention is illustrative only and is not intended to limit the claimed invention. Other embodiments of the present invention will readily suggest themselves to such skilled persons having the benefit of this disclosure. It will be appreciated that in the development of any such actual implementation, numerous implementation-specific decisions must be made in order to achieve the developer's specific goals. Reference will now be made in detail to implementations of the present invention as illustrated in the accompanying drawings. The same reference indicators will be used throughout the drawings and the following detailed description to refer to the same or like parts.

Figure 1A:
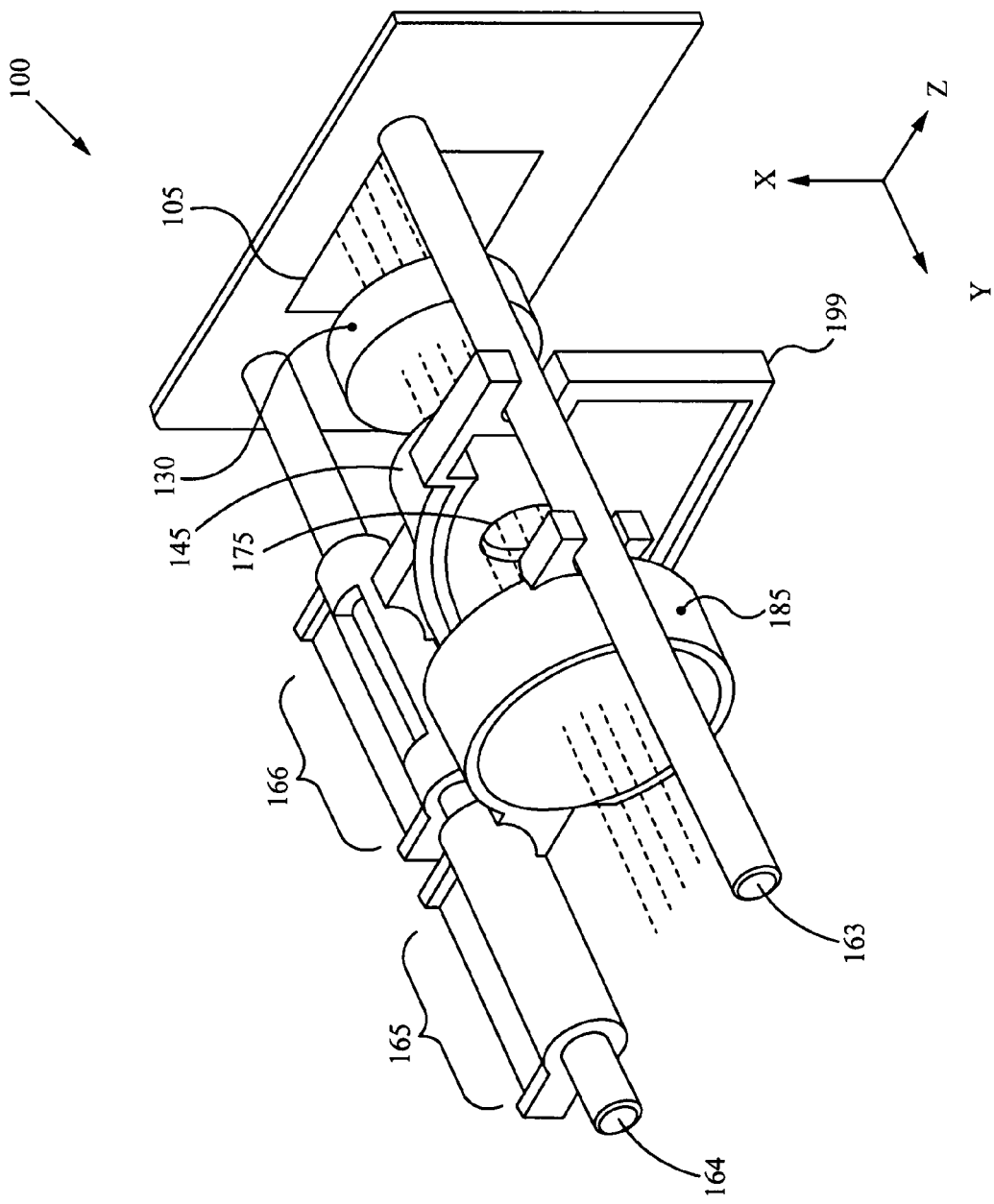
FIG. 1A illustrates a schematic isometric view of a miniature camera chassis with a miniature camera shutter module according to some embodiments of the present invention.

FIG. 1A illustrates a schematic isometric view of a miniature camera chassis 100 with a miniature camera shutter module 199 according to some embodiments of the present invention. The camera chassis 100 also comprises a first optics group 145 and a second optics group 185. Typically, the optics groups 145, 185 comprise one or more optical elements, such as a lenses. Preferably, the miniature camera shutter module 199 is located between the first optics group 145 and the second optics group 185 and the miniature camera shutter module 199 is coupled to the first optics group 145. The miniature camera shutter module 199 contains a conduit 175 passing through its surface and is configured such that light passing through the second optics group 185, travels through the conduit 175 on the miniature camera shutter module 199, passes through the first optics group 145 and then falls incident upon a recording surface 105. In some embodiments of the present invention, a field flattener 130 is positioned in front of the recording surface 105. A field flattener 130 is used to cause light passing therethrough to fall substantially perpendicularly incident upon the recording surface 105.

The miniature camera chassis 100 is also configured with a first guide post 164 and a second guide post 163. A back element 165 and a front element 166 are slidably coupled to the first guide post 164. The back element 165 is coupled with the second optics group 185 and the front element 166 is coupled with the first optics group 145. As such, the second optics group 185, the first optics group 145 and the miniature camera shutter module 199 are able to move along the first guide post 164 and the second guide post 163 in the y-direction, thereby affecting the light properties such as the focal point, depth of field, etc. In the preferred embodiment of the present invention, the miniature camera chassis 100 comprises an auto-focus camera chassis. Examples of such an auto-focus module are further described in U.S. patent Ser. No. 7,531,773, entitled "AUTO-FOCUS AND ZOOM MODULE", which is incorporated herein by reference.

In some embodiment of the present invention, the miniature camera chassis 100 fits within a miniature housing (not shown) and incorporated into a number of consumer electronic devices such as cellular telephones, personal data assistants, etc. According to these embodiments, the relative positions of the second optics group 185 and the first optics group 145 must be tracked in order to communicate information to a processor (not shown) for image processing purposes. In the preferred embodiment of the present invention, the miniature camera shutter module 199 also contains one or more solenoids (not shown) used to control one or more blades (not shown). The one or more blades are configured to at least partially eclipse the conduit 175 upon actuation of the one or more solenoids (discussed below), further affecting image processing.

Figure 1B:
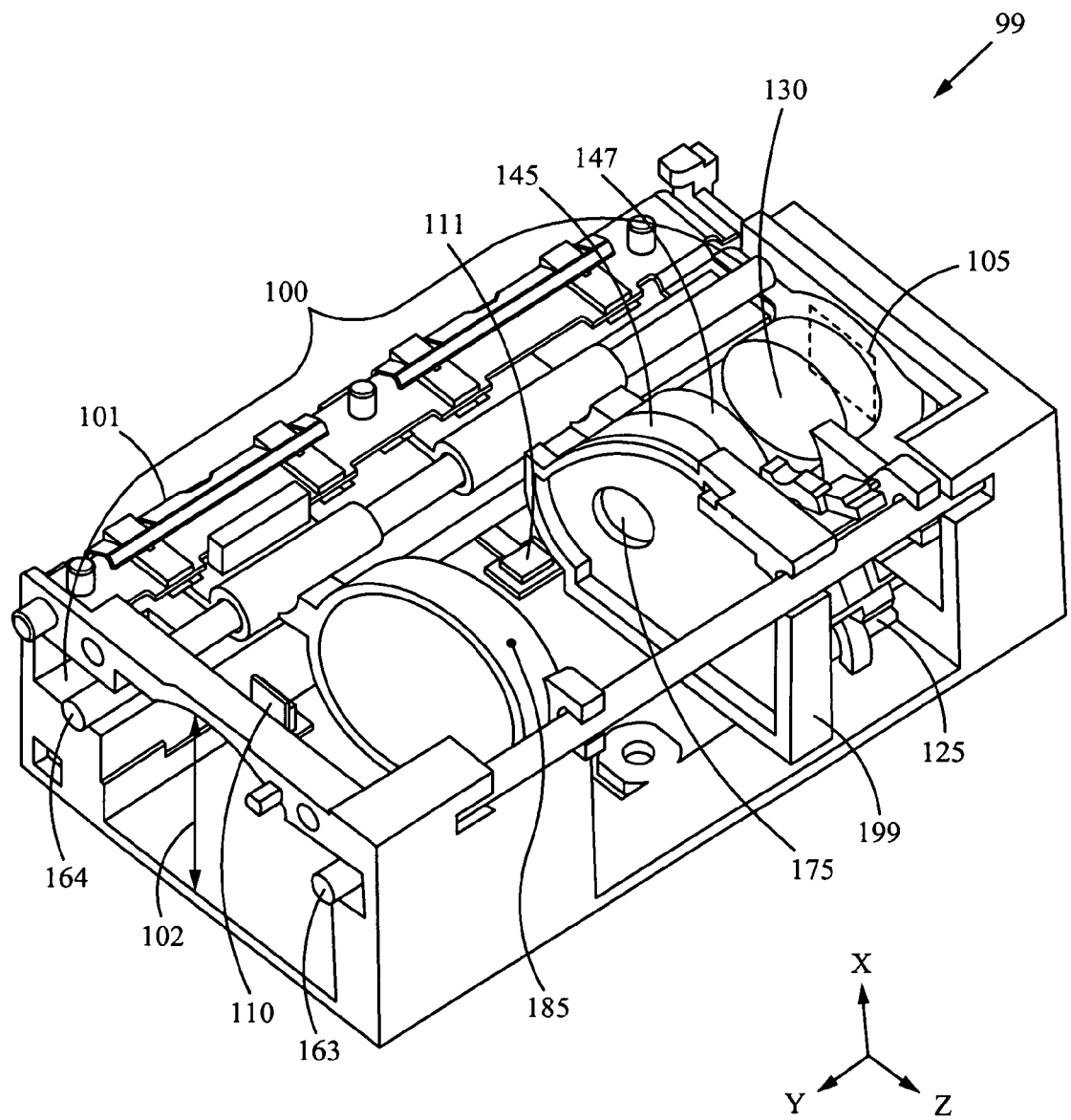
FIG. 1B illustrates a schematic isometric view of a miniature camera housing with a miniature camera shutter module according to some embodiments of the present invention.

FIG. 1B illustrates a schematic isometric view of a housing 99 comprising a miniature camera chassis 100 within a chassis frame 101 according to some embodiments of the present invention. The housing 99 comprises the chassis frame 101, an opening 102 for allowing light into the housing, a first optics group 145 coupled to a miniature camera shutter module 199, a second optics group 185, a first position sensor 110, a second position sensor 111, a field flattener 130 and an imaging surface 105 (indicated with dashed lines) positioned behind the field flattener 130.

In some embodiments of the present invention, the imaging surface 105 is a photographic film or plate. In other embodiments of the present invention, the imaging surface 105 is an array of charge-coupled devices (CCD) or CMOS sensors. However, it will be readily apparent to those having ordinary skill in the art that any imaging surface 105 can be used in conjunction with the present invention. In some embodiment of the present invention, the camera chassis 100 also contains the other devices utilized in photography applications, now known or later developed.

The miniature camera shutter module 199 contains a conduit 175 configured to allow light to pass from the opening 102, through the second optics group 185, through the conduit 175, through the first optics group 145, through the field flattener 130 and finally to fall incident upon the imaging surface 105. The miniature camera shutter module 199 is configured with one or more controllable blades (not shown) and a solenoid device 125. The solenoid device 125 is controllable and is configured to actuate at least one of the one or more blades. When actuated, these blades are configured to at partially eclipse the conduit 175, thus altering the amount and/or quality of light passing through the conduit 175. For instance, in some embodiments of the present invention, a shutter blade (not shown) is used to completely eclipse the conduit 175, thus allowing the imaging surface 105 time to process an image without exposure to additional light.

Furthermore, the first optics group 145 and the second optics group 185 are configured to move in the y-direction. According to these embodiments, the position sensor 110 tracks the movement of the second optics group and the position sensor 111 tracks the movement of the first optics group 145. The position sensor 111 must be able to accurately track the position of the first optics group 145 as its moves in order to deliver precise positional information to the processor (not shown). Therefore, it is very important that the space around the position sensor 111 is not congested with other parts. Due to this space constraint, the miniature camera shutter module 199 of the present invention is designed such that the space around the position sensor 111 is not obstructed while maintaining control of the one or more blades. The prior is achieved by mounting the solenoid device 125 on the miniature camera shutter module 199 away from the position sensor 111 in the z-direction. This placement allows the position sensor 111 to track the position of the first optics group 145 without physical interference from the solenoid device 125.

In some embodiments of the present invention, the miniature camera shutter module has height and width dimensions from five (5) millimeters to ten (10) millimeters and have a conduit diameter of approximately two (2) millimeters. In other embodiments of the present invention, miniature camera shutter module frames are custom-made for any given miniature camera applications.

Figure 2A:
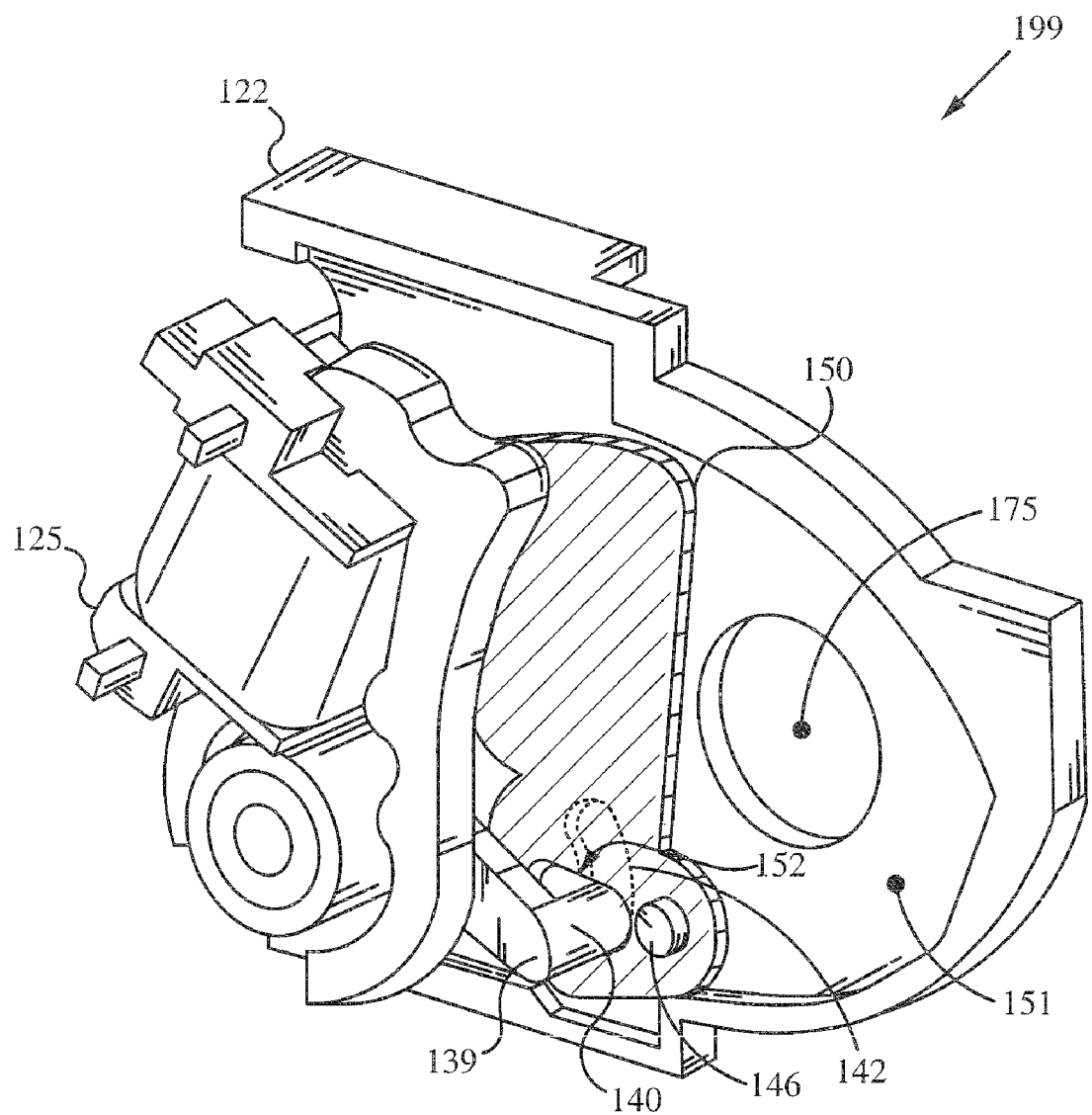
FIG. 2A illustrates a schematic isometric view of a miniature camera shutter module with an unimpeded conduit according to some embodiments of the present invention.
Figure 2B:
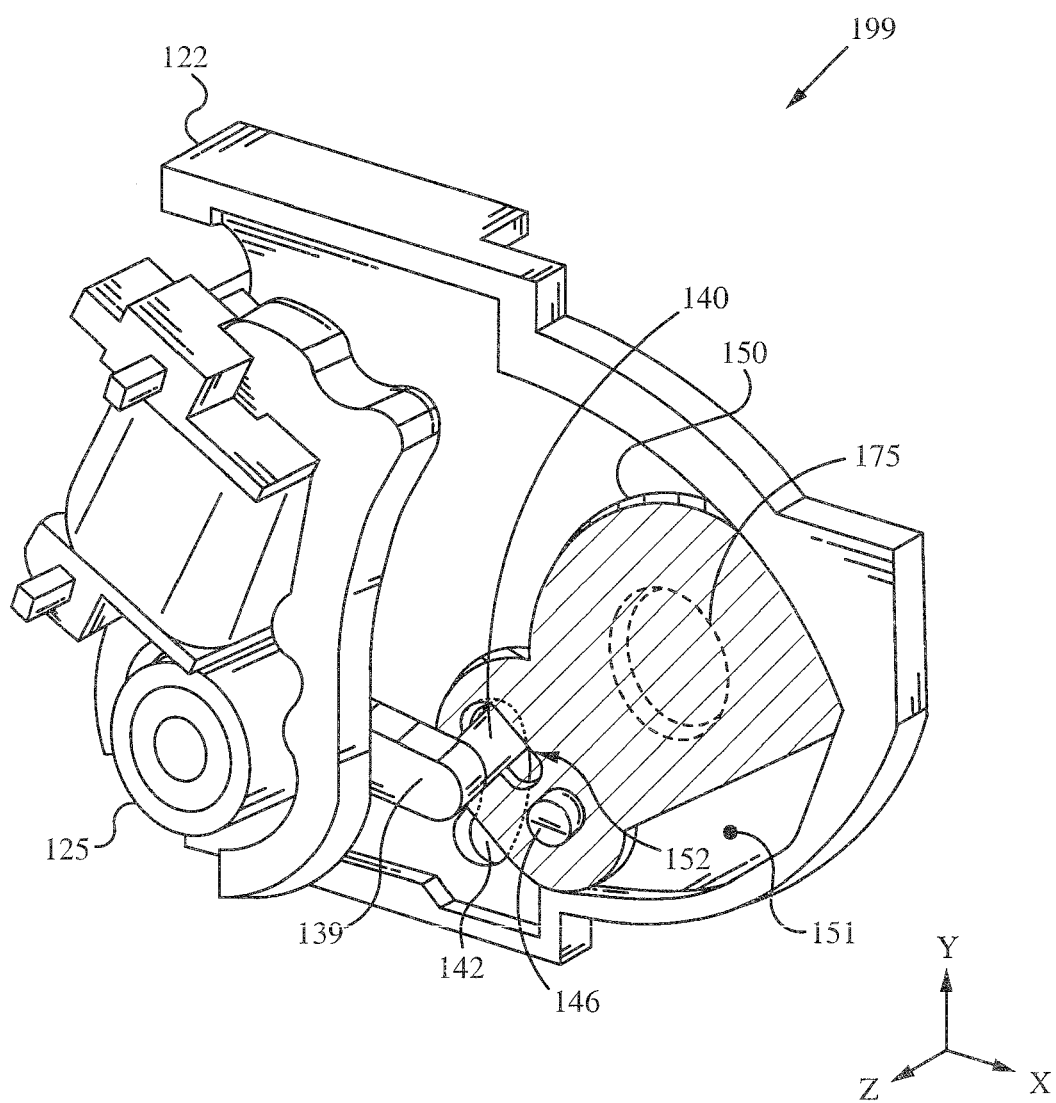
FIG. 2B illustrates a schematic isometric view of a miniature camera shutter module with an impeded conduit according to some embodiments of the present invention.

FIG. 2A illustrates a schematic isometric view of the miniature camera shutter module 199, as shown in FIGS. 1A and 1B. The miniature camera shutter module 199 in FIGS. 2A and 2B is rotated about the x-axis from its FIGS. 1A and 1B position in order to show detail. The miniature camera shutter module 199 comprises a module frame 122 coupled to a solenoid device 125. The conduit 175 passes through the module frame 122. The solenoid device 125 comprises a transducer which converts an electric signal into a mechanical force. The solenoid device 125 is coupled to an arm 139 and a pin 140 and creates a mechanical force (when provided with an electric signal) which moves the arm 139 and the pin 140. The pin 140 is coupled to a blade 150, and movement of the pin 140 manipulates the blade 150. A guide 152 is disposed in the blade 150 to facilitate movement of the pin 140. In some embodiments of the present invention, the blade 150 is coupled to the module frame 122 by an axle 146. According to these embodiments, the solenoid device 125 receives an electric signal, and causes the pin 140 to rotate the blade 150 about the axle 146.

As shown, the arm 139 extends from the solenoid device 125 to a point above the first blade 150 and then the pin 140 angles toward the module frame 122. In some embodiments of the present invention, a channel 142 (indicated with dashed lines) is disposed in the module frame 102. According to these embodiments, the pin 140 passes through the blade 150 and fits within the channel 142 which accepts the movement of the pin 140 as the solenoid device 125 moves the arm 139. The pin 140, the channel 142 and the blade 150 are configured such that the blade 150 alternatively eclipses the conduit 175 and leaves the conduit 175 un-impeded as the solenoid is switched. As shown, the blade 150 is in the "open" position, meaning the blade 150 is not eclipsing the conduit 175.

As illustrated in FIG. 2A, the blade 150 is an opaque shutter. The opaque shutter completely blocks the conduit 175 when the blade 150 is in a "closed" position (explained below). Although the blade 150 is shown as an opaque shutter, it will be readily apparent to those having ordinary skill in the relevant art that the blade 150 may comprise a number of camera accessories including, but not limited to: apertures, monochromatic filters and neutral-density filters, among others.

In operation, a command delivers an electric signal to the solenoid device 125. The solenoid device 125 actuates the arm 139 and the pin 140 such that the blade 150 rotates about the axle 146. As the blade 150 rotates about the axle 146, the conduit 175 becomes eclipsed. In some embodiments of the present invention, the solenoid device 125 automatically disengages the arm 139 and the pin 140 after a given time such that the blade 150 re-opens the conduit 175. In other embodiments of the present invention, another electric signal must be delivered to the solenoid device 125 in order to disengage the blade 150.

In some embodiments of the present invention, the module frame 122 is configured with a recessed area 151. The recessed area 151 has a surface area and thickness such that the blade 150 is substantially housed within the recessed area 151 and does not protrude from the recessed area 151 during its movement. However, it will be readily apparent to those having ordinary skill in the art that the blade 150 and the module frame 122 can have a number of configurations, shapes, and positions in relation to the other components of the camera shutter module while still achieving the objects of the present invention.

In some embodiments of the present invention, a cover (not shown) is placed over the miniature camera shutter module 199 (explained below).

FIG. 2B illustrates a schematic isometric view of the camera shutter module 199 shown in 2A, with the blade 150 in a "closed" position, covering the conduit 175 (indicated with dashed lines). As shown in FIG. 2B, the solenoid device 125 is coupled to the module frame 122, the arm 139 extends from the solenoid device 125 to a point above the blade 150 and then the pin 140 extends toward the module frame 122. The pin 140 passes through the blade 150 and fits within a channel 142 (partially indicated with dashed lines). Upon actuation of the solenoid device 125, the pin 140 moves from the lower part of the channel 142 to the upper part of the channel 142, thus rotating the blade 150 about the axle 146 and eclipsing the conduit 175. As shown, the blade 150 remains within the recessed area 151 during its movement.

Referring again to FIG. 1B, light traversing through the first optics group 145, the second optics group 185, the miniature camera shutter module 199 and the field flattener 130 create an image circle (not shown). The image circle represents the recordable portion of the light. In the preferred embodiment of the present invention, the first optics group 145, the second optics group 185, the miniature camera shutter module 199 and the field flattener 130 are configured such that the imaging surface 105 is completely saturated by the image circle.

FIG. 3A illustrates a schematic isometric view of an alternative miniature camera chassis 300 with an alternative miniature camera shutter module 399 having a conduit 375 according to some embodiments of the present invention. The alternative miniature camera shutter module 399 shown in FIG. 3A is shown without a solenoid device, blade or other details for clarity purposes only. It will be clear to those having ordinary skill in the art that these (and other) features may be included, in whole or in part, and in numerous configurations consistent with the modules described in other parts of this disclosure.

The alternative miniature camera chassis 300 also comprises a first optics group 345 and a second optics group 385. According to some embodiments, the miniature camera shutter module 399 is kept stationary, while a first optics group 345 and a second optics group 385 are configured to move along a first guide post 364 and a second guide post 363 in the y-direction. The movement of the first optics group 345 and the second optics group 385 achieve functions of the miniature camera chassis 300, such as zoom and auto-focus. Preferably, light traversing the second optics group 385, the first optics group 345 and the miniature camera shutter module 399 preferably has an image circle (explained above) that completely saturates the imaging surface 305.

The miniature camera chassis 300 also comprises a first position sensor 310 and a second position sensor 311 to track the movement of the first optics group 345 and the second optics group 385. As such, the miniature camera shutter module 399 is configured with at least one solenoid device (not shown) positioned so as not to obstruct the "view" of the position sensors 310, 311.

Figure 3B:
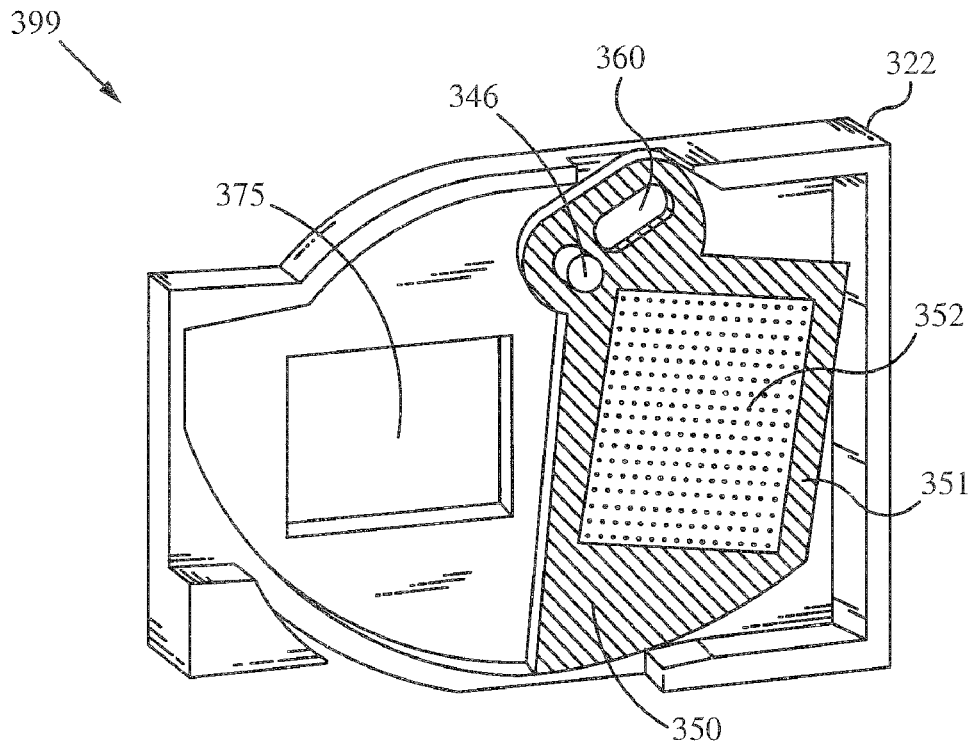
FIG. 3B illustrates a schematic isometric view of an alternative miniature camera shutter module with a blade frame and a filter according to some embodiments of the present invention.

FIG. 3B illustrates an alternative embodiment of a miniature camera shutter module 399 according to some embodiments of the present invention. The camera shutter module 399 illustrated in FIG. 3A is configured to fit within the miniature camera chassis of FIG. 3A and comprises a module frame 322, a blade 350 coupled to an axle 346 and a conduit 375. A solenoid device (not shown) is coupled to the module frame 322. The solenoid device is coupled to an arm (not shown) and a pin (not shown). The module frame 322 is also configured with a channel (not shown) passing through its surface. The blade 350 is also configured with a guide 360. The guide 360 facilitates the movement of the arm and pin. When the solenoid device is actuated, the arm moves the pin through the channel and exerts a force on the guide 360, causing the blade 350 to at least partially eclipse the conduit 375.

In some embodiments of the present invention, the blade 350 comprises a blade frame 351 housing a filter 352. A blade frame 351 is used to house the filter 352 because filters are often times too brittle to couple directly to the arm and the pin 340 without becoming damaged after repeated movement of the parts.

The blade 350 and filter 352 shown in FIG. 3B is shown to be substantially rectangular in shape. This configuration easily accommodates those miniature camera applications having a substantially rectangular imaging surface.

In some embodiments of the present invention, the filter 352 is a neutral-density filter. A neutral-density filter filters out equal portions of a wide range of wavelengths of light passing therethrough and is a common photography device. In other embodiments of the present invention, the filter 352 is a monochromatic filter. Monochromatic filters filter out light having a small range of wavelengths. Although neutral-density filters and monochromatic filters are specifically disclosed, any appropriate filter is equally envisioned.

As explained above, in some embodiments of the present invention, the module frame 322 is positioned within the camera chassis of FIG. 3A. According to these embodiments, the conduit 375 lines up with an imaging surface (not shown in FIG. 3B), and as explained above, the conduit 375 is configured such that an image circle passing through the conduit 375 substantially completely saturates the imaging surface.

In some embodiments of the present invention, the imaging surface is a photographic film or plate. In other embodiments of the present invention, the imaging surface is an array of charge-coupled devices (CCD) or CMOS sensors. However, it will be readily apparent to those having ordinary skill in the art that any imaging surface can be used in conjunction with the present invention. The camera chassis also contains the other necessary devices utilized in known methods of photography. The camera shutter module 399 depicted in FIG. 3B is in an "open" position. When the blade 350 is in an "open" position, the conduit 375 remains un-impeded by the blade 350. As such, light incident on the conduit 375 is not altered by the blade 350.

Figure 3C:
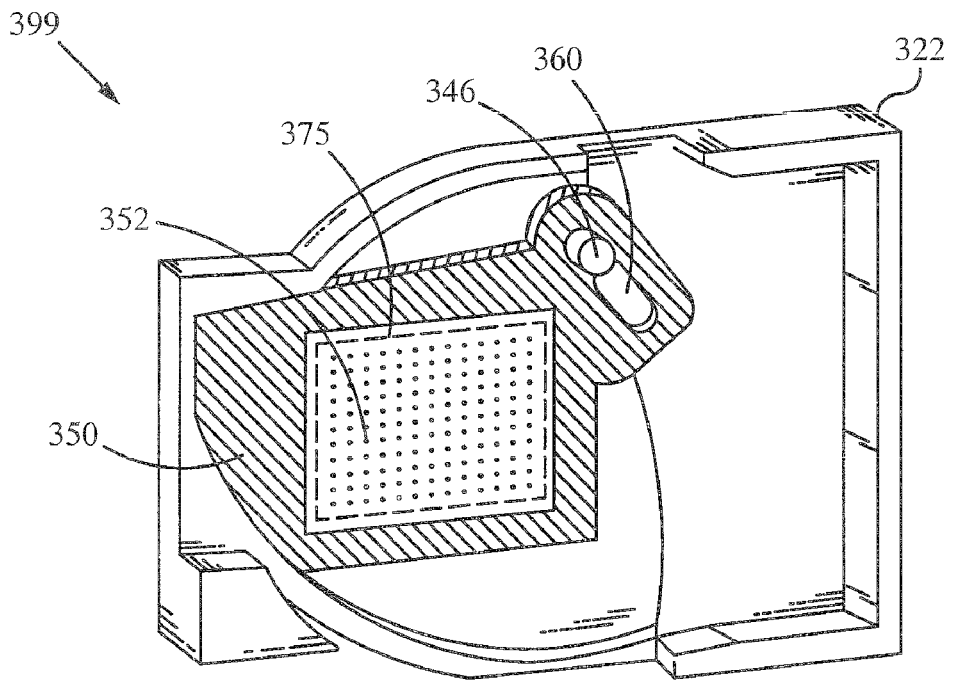
FIG. 3C illustrates a schematic isometric view of an alternative miniature camera shutter module with a blade frame and a filter impeding a conduit according to some embodiments of the present invention.

FIG. 3C illustrates the alternative miniature camera shutter module 399 with the blade 350 in a "closed" position. The blade is moved to a "closed" position over the conduit 375 (indicated by dashed lines) by a solenoid device (not shown). As such, light falling incident on the conduit is filtered by the filter 352. In some embodiments of the present invention, additional solenoid devices (not shown) and/or additional blades (not shown) are positioned on camera shutter module 399.

Figure 3D:
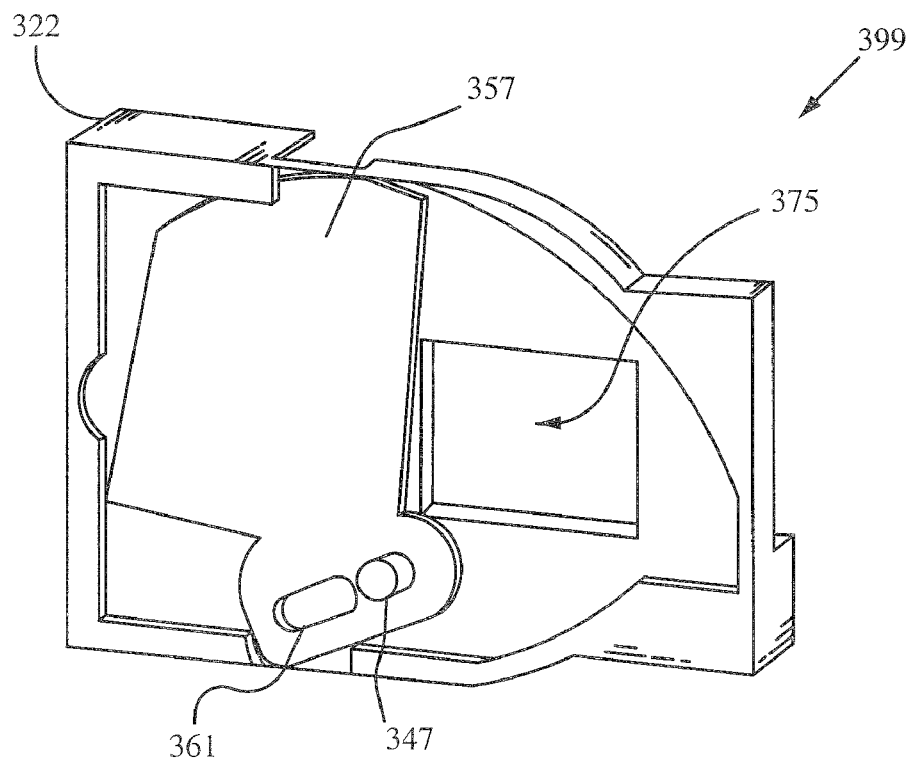
FIG. 3D illustrates a schematic isometric view of the alternative miniature camera shutter module with a shutter blade in an "open" position.
Figure 3E:
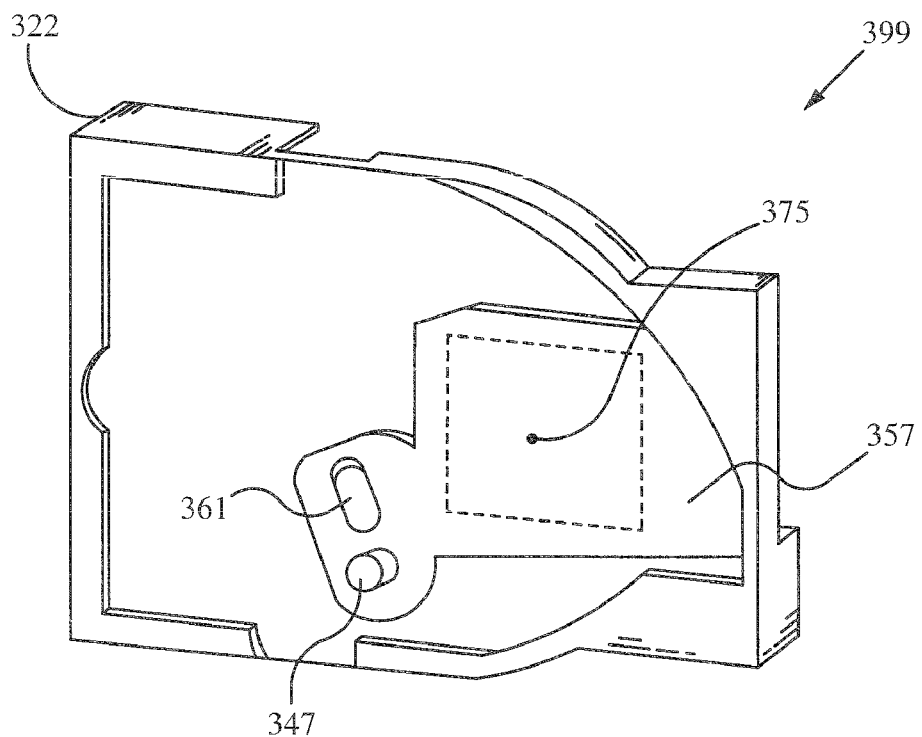
FIG. 3E illustrates a schematic isometric view of the alternative miniature camera shutter module with a shutter blade in an "closed" position.

FIGS. 3D and 3E illustrate schematic isometric views of the opposite side of the alternative miniature camera shutter module 399 than those views shown in FIGS. 3B and 3C. The miniature camera shutter module 399 comprises a module frame 322, a conduit 375, and a blade 357 with an axle 347 and a guide 361. FIG. 3D is shown in the "open" position, meaning that the blade is not eclipsing the conduit 375. In some embodiments of the present invention, the blade 357 is a opaque shutter used to completely block light from passing through the conduit 375 when the blade 357 is in the "closed" position. FIG. 3E illustrates the miniature camera shutter module 399 in a "closed" position wherein the opaque shutter blade 357 is completely eclipsing the conduit 375 (indicated with dashed lines).

As explained above, it is desirable to provide a miniature camera shutter module with the ability to manipulate a blade to affect the light passing through a miniature camera shutter module. In other embodiments of the present invention, a miniature camera shutter module with at least two blades is disclosed, wherein the blades each accomplish a function and wherein the miniature camera shutter module is configured with a geometry which will not obstruct the position sensor.

FIGS. 4A-4G illustrate examples of miniature camera shutter modules that are able manipulate light in more than one way. For example, it is oftentimes desirable to shutter light and also to allow light through a conduit, but to provide an aperture which is able to at least partially eclipse the conduit. Using an aperture allows less than 100% of the light through the aperture on to the imaging surface. Also, it is sometimes desirable to filter and shutter light. Therefore, it is another object of the present invention to provide a miniature camera shutter module that is able to actuate more than one blade while maintaining space saving aspects that allow the use of position sensors without obstruction.

Figure 4A:
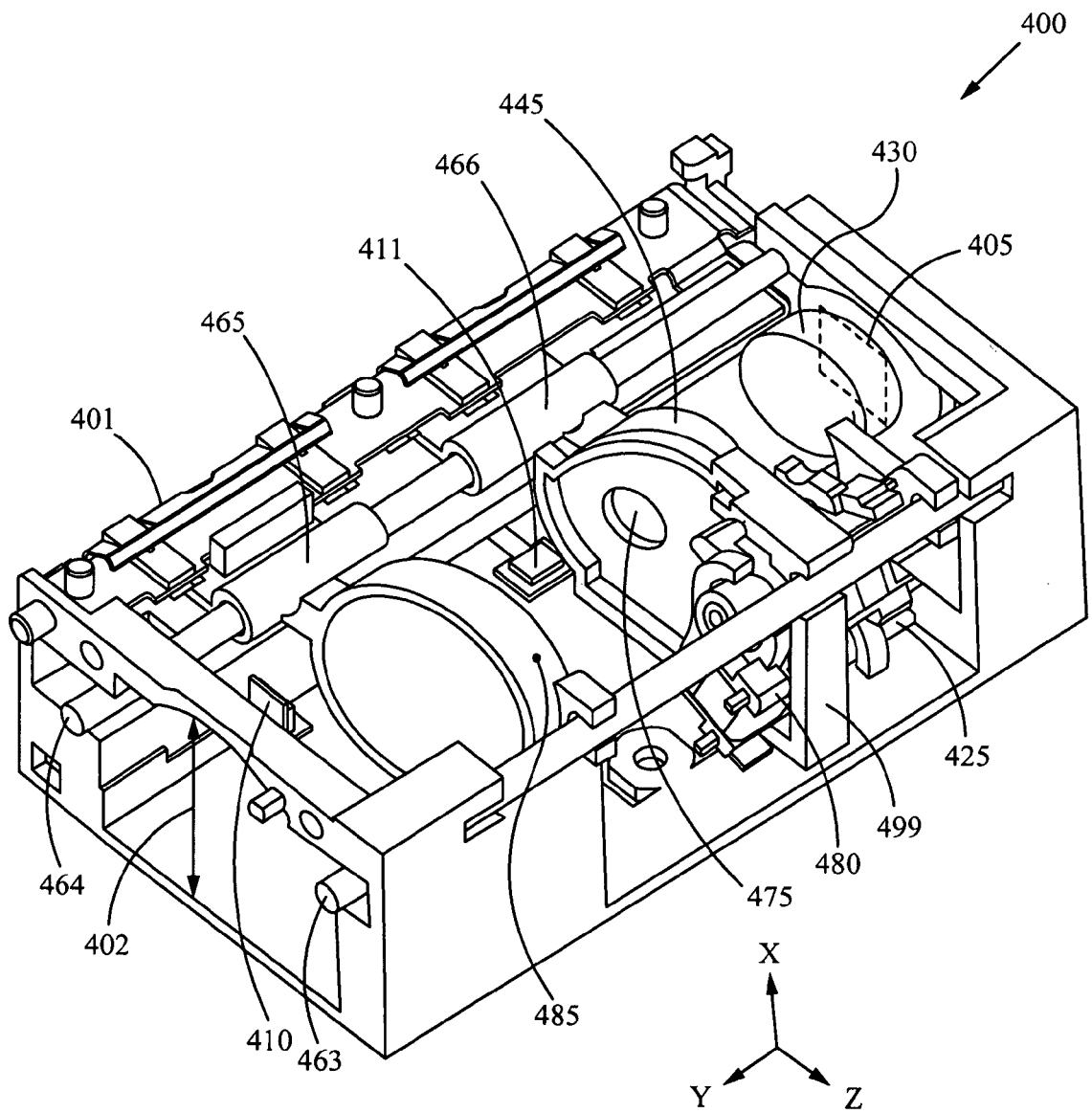
FIG. 4A illustrates a schematic isometric view of a miniature camera chassis housing a miniature camera shutter module with two solenoids according to some embodiments of the present invention.

FIG. 4A illustrates a schematic isometric view of a miniature camera chassis 400, housing a miniature camera shutter module 499 with a multiple solenoids, 425 and 480 according to some embodiments of the present invention. The camera chassis 400 comprises a chassis frame 401, an opening 402 for letting light into the chassis 400, a position sensor 410, a position sensor 411, a first optics group 445, a second optics group 485, the miniature camera shutter module 499, a field flattener 430, a first guide post 464, a second guide post 463 and an imaging surface 405 (indicated with dashed lines). In some embodiments of the present invention, the imaging surface 405 is a photographic film or plate. In other embodiments of the present invention, the imaging surface 405 is an array of charge-coupled devices (CCD) or CMOS sensors. However, it will be readily apparent to those having ordinary skill in the art that any imaging surface 405 can be used in conjunction with the present invention. The camera chassis 400 also contains the other necessary devices utilized in photography applications, now known or later developed.

The miniature camera shutter module 499 contains a conduit 475 configured to allow light to pass from the opening 402, through the second optics group 485, through the conduit 475, through the first optics group 445, through the field flattener 430 and then falls incident on the image surface 405.

A front element 466 and a rear element 465 are slidably coupled to the first guide post 464. In the preferred embodiments of the present invention, the miniature camera shutter module 499 is coupled to the first optics group 445 and the second optics group 485 is coupled to the rear element 465. According to these embodiments, the first optics group 445, the miniature camera shutter module 499 and the second optics group 485 are configured to move along the first guide post 464 and the second guide post 463 in the y-direction. Accordingly, the position sensor 411 tracks the position of the miniature camera shutter module 499 and the position sensor 410 tracks the position of the second optics group 485. As explained above, the position sensors 410, 411 must not be congested with other parts in order to accurately track the parts. Due to this space constraint, the miniature camera shutter module 499 of the present invention is designed such that the space around the position sensor 411 is not obstructed. This is achieved by mounting the solenoid devices 425, 480 on away from the position sensors 410, 411 in the z-direction.

As explained above, the miniature camera shutter module 499 is configured with multiple solenoids devices 425, 480. The solenoid devices 425, 480 are controllable and are configured to each actuate one or more blades (not shown). When actuated, these blades are configured to at least partially eclipse the conduit 475, thus altering the amount and/or quality of light passing through the conduit 475.

Figure 4B:
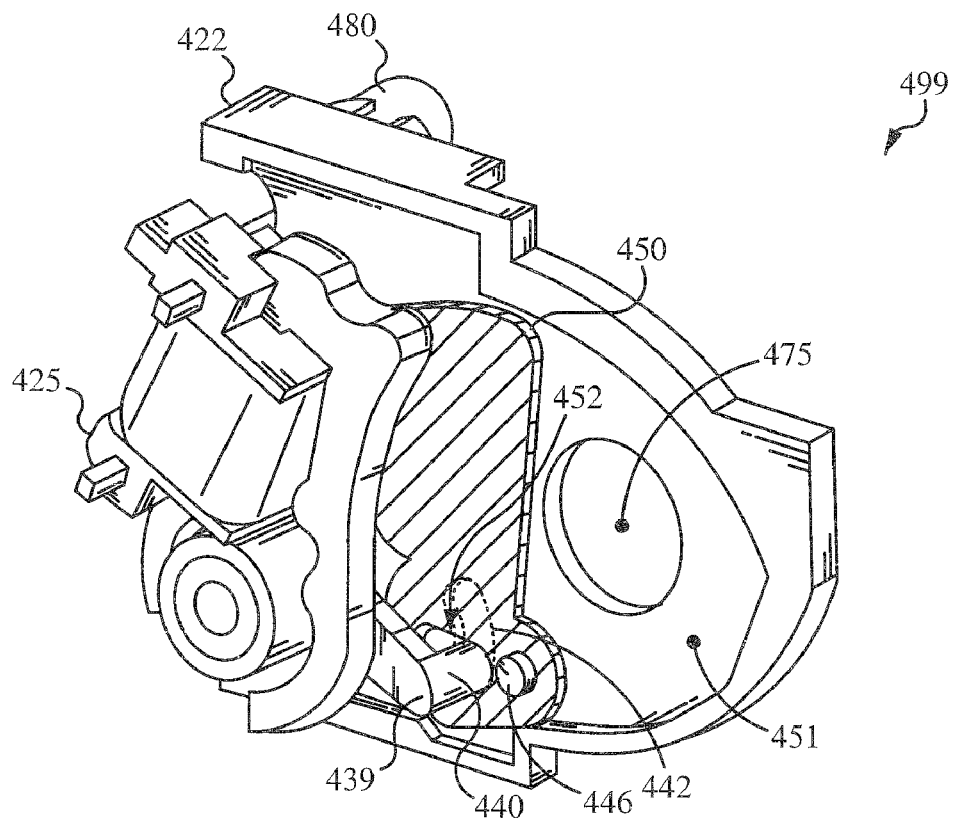
FIG. 4B illustrates a schematic isometric view of a first side of a miniature camera shutter module with more than one solenoid and with an unimpeded conduit according to some embodiments of the present invention.

FIG. 4B illustrates a schematic isometric view of the miniature camera shutter module 499 with multiple solenoid devices 425 and 480 according to some embodiments of the present invention. The miniature camera shutter module 499 contains a first solenoid 425 coupled to the module frame 422. The first solenoid 425 moves a first arm 439 and a first pin 440 in a first channel 442 (partially indicated with dashed lines) to manipulate a first blade 450. The blade 450 is configured with a guide 452 used to facilitate the movement of the pin 440. Additionally, a second solenoid device 480 is coupled to the opposite side of the module frame 422. As shown in FIG. 4A, the first blade 450 is a shutter.

Figure 4C:
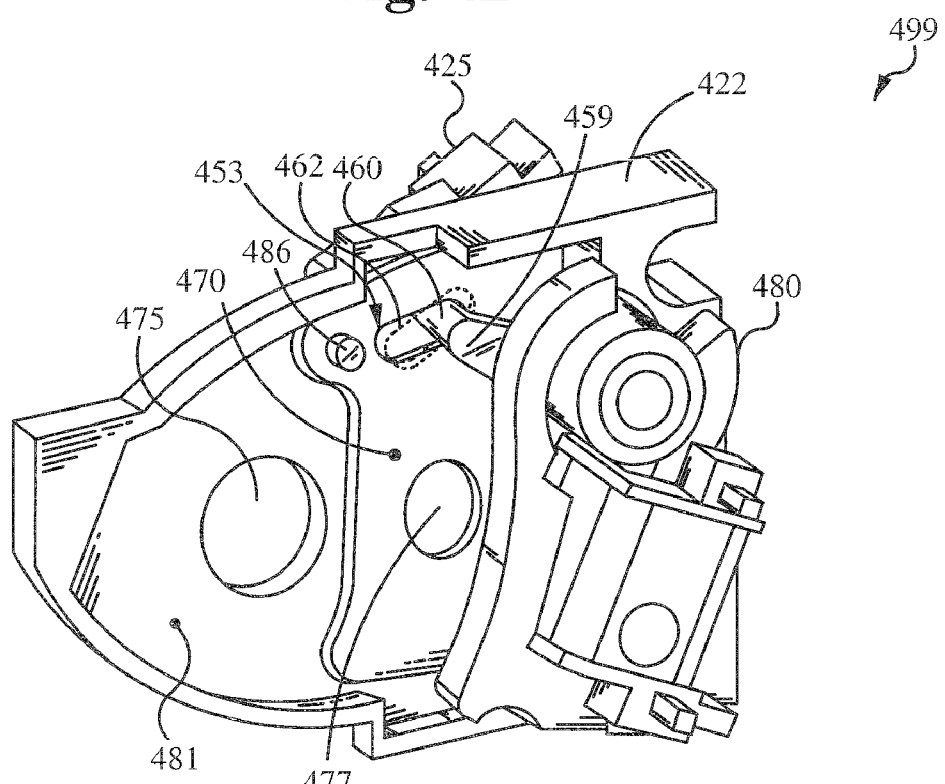
FIG. 4C illustrates a schematic isometric view of a second side of a miniature camera shutter module with more than one solenoid and with an unimpeded conduit according to some embodiments of the present invention.

FIG. 4C illustrates a schematic isometric view of the opposite side of the miniature camera shutter module 499 than that shown in FIG. 4B. As shown, the second solenoid device 480 comprises a transducer which converts an electric signal into a force in order to move the second arm 459 and the second pin 460 thus manipulating the second blade 470. The second blade 470 is coupled to the module frame 422 by an axle 486 and is able to rotate about the axle 486 as the second arm 459 and the second pin 460 move. The blade 470 is configured with a guide 453 used to facilitate the movement of the pin 460. As such, the second blade 470 alternatively eclipses the conduit 475 and leaves the conduit 475 un-impeded.

According to FIG. 4C, the second blade 470 is in the "open" position, meaning the second blade 470 is not eclipsing the conduit 475. As shown, the second blade 470 is an aperture blade, which comprises an aperture 477 in the second blade 470. The aperture 477 is a conduit which is at least partially smaller than the conduit 475 and at least partially blocks the conduit 475 when the second blade 470 is in a "closed" position.

Although the second blade 470 is shown as an aperture, it will be readily apparent to those having ordinary skill in the art that the second blade 470 may comprise a number of camera accessories including, but not limited to: shutters, monochromatic filters and neutral-density filters, dynamic radius apertures, among others.

Also shown in FIG. 4C, the second arm 459 extends from the second solenoid device 480 to a point above the second blade 470 and then the second pin 460 angles toward the module frame 422. In some embodiments of the present invention, the second pin 460 passes through the second blade 470 and fits within the channel 462 (indicated with dashed lines) which facilitates the movement of the second pin 460. The first solenoid 425 is configured such that the first pin 440 passes through the module frame 422 near the bottom of the module frame 422 and the second solenoid 480 is configured such that the second pin 460 passes through the module frame 422 near the top of the module frame 422. Such a configuration allows both the first solenoid 425 and the second solenoid 480 to effectuate the full range of blade motion without interfering with each other. This configuration avoids the need to use multiple modules within a camera chassis to achieve the same results. As such, this configuration helps achieve at least two objects of the present invention: to maintain a very small size camera shutter module and to provide a module with at least two blades while maintaining an unobstructed view of the position of the miniature camera shutter module by the position sensor (not shown in FIG. 4C).

In some embodiments of the present invention one signal effectuates actuation of both solenoids 425 and 480. In certain embodiments, one signal effectuates a staggered movement of the blades 450 and 470. In other embodiments, one signal effectuates simultaneous movement of blades 450 and 470.

Figure 4D:
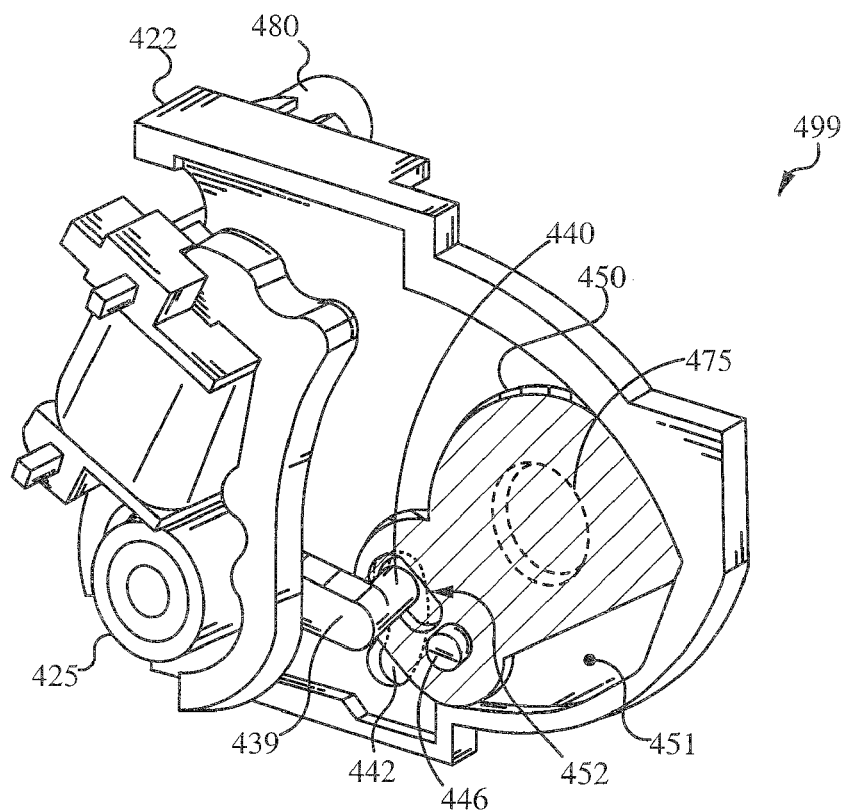
FIG. 4D illustrates a schematic isometric view of a first side of a miniature camera shutter module with more than one solenoid and with an impeded conduit according to some embodiments of the present invention.

FIG. 4D illustrates a schematic isometric view of the camera shutter module 499, with the first blade 450 in a "closed" position, covering the conduit 475 (indicated with dashed lines). As explained above, the first solenoid device 425 is coupled to the module frame 422 and the first solenoid controls the first blade 450. Upon actuation of the first solenoid device 425, the first pin 440 moves from the lower part of the channel 442 to the upper part of the channel 442, thus rotating the first blade 450 about the axle 446 and eclipsing the conduit 475.

Figure 4E:
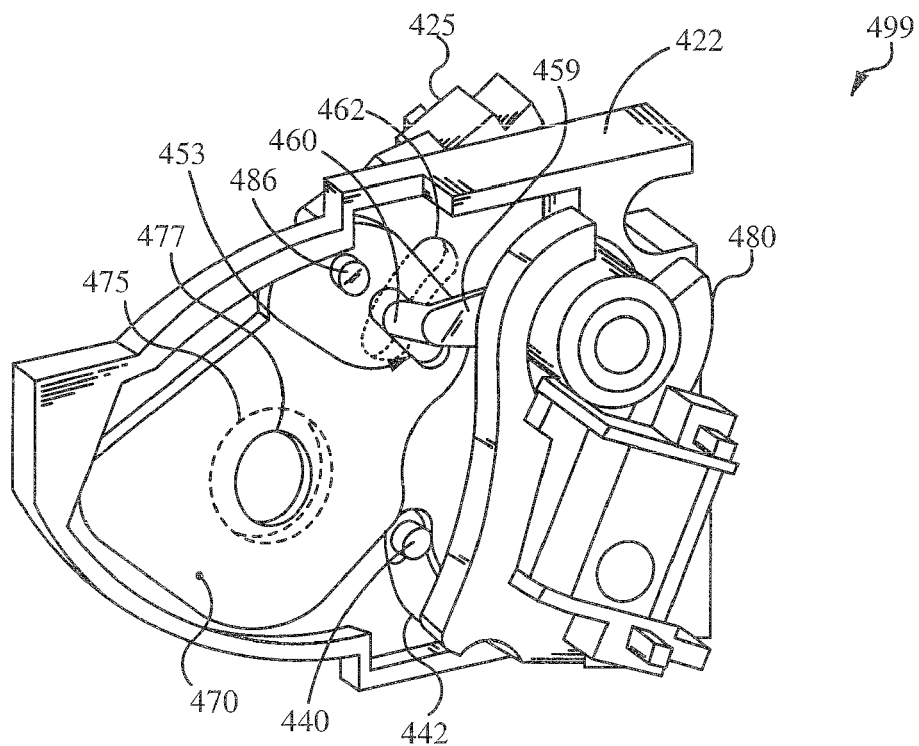
FIG. 4E illustrates a schematic isometric view of a second side of a miniature camera shutter module with more than one solenoid and with an impeded conduit according to some embodiments of the present invention.

FIG. 4E illustrates the miniature camera shutter module 499 with the blade 470 in a "closed" position. As shown, the second arm 459 has been actuated, moving the second pin 460 from the top part of the channel 462 to the lower part of the channel 462, thus effectuating rotation of the second blade 470 about the axle 486. In the "closed" position, the aperture 477 partially eclipses the conduit 475.

Figure 4F:
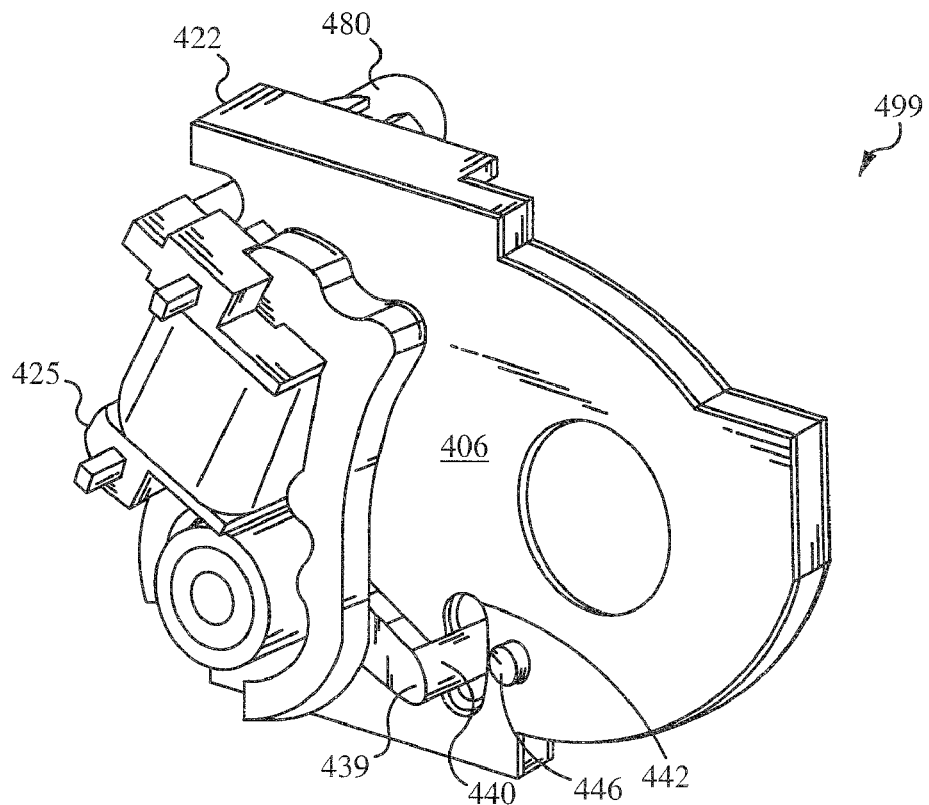
FIG. 4F illustrates a schematic isometric view of a miniature camera shutter module with a cover according to some embodiments of the present invention.
Figure 4G:
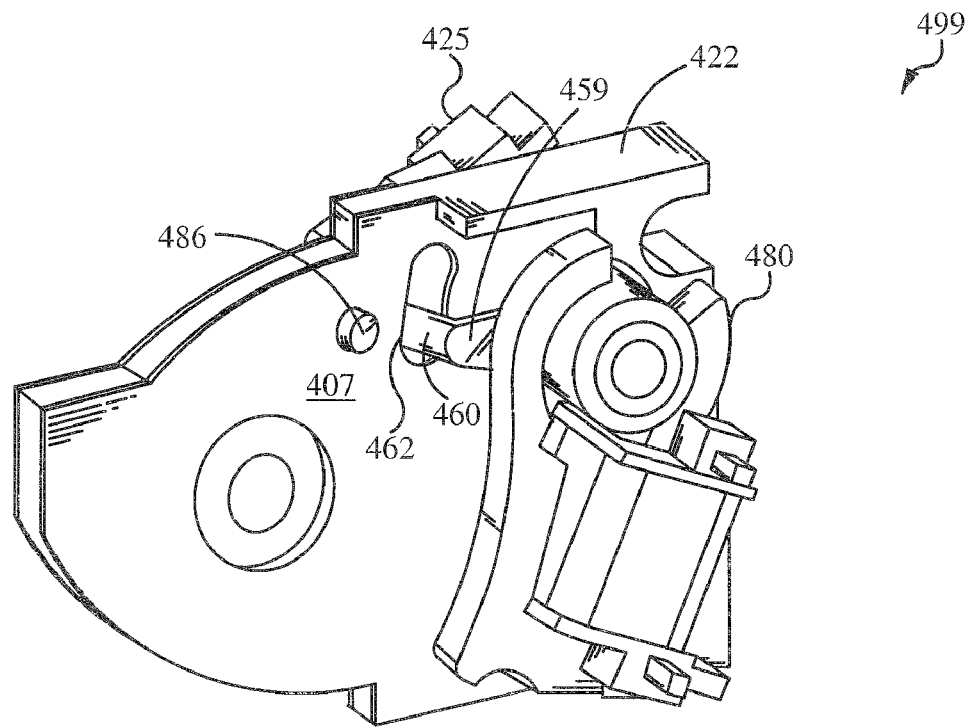
FIG. 4G illustrates a schematic isometric view of a miniature camera shutter module with a cover according to some embodiments of the present invention.

FIGS. 4F and 4G illustrate the miniature camera shutter module 499 configured with covers 406 and 407 according to some embodiments of the present invention. In some embodiments, the covers 406 and 407 are configured to cover and protect the moving parts such as the blades 450 and 470, the guides 452, 453 and the channels 442, 462.

As described, the present invention solves problems present in existing miniature camera systems. The present invention provides a practical way to shutter light and to provide apertures and filters to alter the quality of light in miniature camera applications. By using more than one blade to shutter a conduit, the miniature camera shutter module is able to be smaller since the minimum size of each shutter is smaller than the size of the conduit.

Due to advantages of the present invention, the miniature camera shutter module is able to be integrated within small scale consumer electronic devices including, but not limited to: cellular phones and personal digital assistants. Also, the present invention allows filters and apertures to be used in conjunction with the shutter blades while being housing within the same miniature camera shutter module. As such, the miniature camera shutter module is able to be used in miniature camera applications utilizing auto-focus and zoom features.

The present application has been described in terms of specific embodiments incorporating details to facilitate the understanding of the principles of construction and operation of the miniature camera shutter and filter/aperture apparatus. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen without departing from the spirit and scope of the application.

What is claimed is:

1. A miniature camera shutter module comprising:
   a. a module frame comprising a surface with a conduit passing therethrough;
   b. a solenoid coupled to the module frame;
   c. a pin coupled to the solenoid;
   d. an axle coupled to the module frame;
   e. at least one blade coupled to the pin and the axle, wherein the at least one blade is substantially disposed in the same plane as the module frame, wherein the solenoid is configured to receive a first electric signal for actuating the solenoid, and wherein the at least one blade is configured such that the actuation of the solenoid causes the pin to move, causing the at least one blade to rotate about the axle and at least partially eclipse the conduit; and
   f. at least one ancillary blade coupled to the module frame, wherein the module frame is positioned between the at least one blade and the at least one ancillary blade.

2. The miniature camera shutter module according to claim 1, further comprising a channel in the module frame, wherein the pin passes through the at least one blade and at least partially extends into the channel such that, as the solenoid actuates the pin, the pin moves within the channel.

3. The miniature camera shutter module according to claim 2, wherein the solenoid is coupled to a first side of the module frame, wherein the at least one blade is disposed on a second side of the module frame, wherein the pin passes from the first side of the module frame through the channel to the second side of the module frame and wherein the pin couples with the at least one blade.

4. The miniature camera shutter module according to claim 1, wherein the at least one blade comprises an opaque shutter such that when the at least one blade eclipses the conduit, the at least one blade obstructs light passing through the conduit.

5. The miniature camera shutter module according to claim 1, wherein the at least one blade comprises an aperture blade having an aperture positioned on the surface of the aperture blade, wherein the aperture is smaller then the conduit such that, as the at least one blade eclipses the conduit, the aperture at least partially obstructs light from passing through the conduit.

6. The miniature camera shutter module according to claim 1, wherein the at least one blade comprises a filter blade having a filter coupled to the at least one blade such that, as the at least one blade eclipses the conduit, the filter at least partially filters light from passing through the conduit.

7. The miniature camera shutter module according to claim 6, wherein the filter is a wavelength-specific filter, wherein the wavelength-specific filter filters out the portion of light passing through the conduit having a particular range of wavelengths.

8. The miniature camera shutter module according to claim 6, wherein the filter is a neutral-density filter, wherein the neutral-density filter filters all wavelengths of light passing through the conduit.

9. The miniature camera shutter module according to claim 1, further comprising:
   a. at least one ancillary solenoid coupled to the module frame;
   b. at least one ancillary pin coupled to the at least one ancillary solenoid; and
   c. at least one ancillary axle coupled to the module frame, wherein the at least one ancillary blade is coupled to the at least one ancillary pin and to the at least one ancillary axle, wherein the at least one ancillary blade is substantially disposed in the same plane as the module frame, wherein the at least one ancillary solenoid is configured to receive a second electrical signal, wherein the second electric signal actuates the at least one ancillary solenoid, wherein actuation of the at least one ancillary solenoid causes the at least one ancillary pin to move, causing the at least one ancillary blade to at least partially eclipse the conduit.

10. The miniature camera shutter module according to claim 9, wherein the solenoid is coupled to a first side of the module frame, wherein the at least one ancillary solenoid is coupled to a second side of the module frame, and wherein the solenoid and the at least one ancillary solenoid are substantially co-planar on a plane perpendicular to the plane of the modular frame.

11. The miniature camera shutter module according to claim 9, wherein the first electric signal and the second electric signal are delivered to the first solenoid device and the at least one ancillary solenoid device simultaneously.

12. The miniature camera shutter module according to claim 9, wherein the first electric signal and the second electric signal are delivered to the first solenoid device and the at least one ancillary solenoid device separately in time.

13. The miniature camera shutter module according to claim 9, further comprising at least one ancillary channel consisting of a channel in the module frame, wherein the at least one ancillary pin passes through the at least one ancillary blade and at least partially extends into the at least one ancillary channel such that, as the at least one ancillary solenoid moves the at least one ancillary pin, the direction of the movement of the at least one ancillary pin is directed by the at least one ancillary channel.

14. The miniature camera shutter module according to claim 1, wherein the at least one ancillary blade comprises a blade with an aperture positioned on the surface of the at least one ancillary blade, wherein the aperture is smaller then the conduit such that, when the at least one ancillary blade eclipses the conduit, the aperture at least partially obstructs light from passing through the conduit.

15. The miniature camera shutter module according to claim 1, wherein the at least one ancillary blade comprises a blade with a filter coupled to the at least one ancillary blade such that as the at least one ancillary blade eclipses the conduit, the filter at least partially filters light from passing through the conduit.

16. The miniature camera shutter module according to claim 1, further comprising:
   a. a miniature camera chassis comprising:
      i. an enclosure with an opening on a first side of the enclosure for allowing light to enter the miniature camera chassis; and
      ii. an imaging surface disposed on a second side of the enclosure, wherein light entering the miniature camera chassis through the opening is directed toward the imaging surface, wherein the opening and the imaging surface are co-axial on a first axis;
   b. a moving package comprising:
      i. a lens package, wherein the lens package directs light from the opening toward the miniature camera shutter module; and
      ii. the miniature camera shutter module, wherein at least a portion of the light passes through the conduit of the module frame, and wherein the moving package moves on the first axis;
   c. a focusing lens, wherein the portion of light that passes through the conduit of the module frame is focused onto the imaging surface, producing a recordable image; and
   d. at least one position sensor coupled to the miniature camera chassis, wherein the at least one position sensor tracks the movement of the moving package.

17. The miniature camera shutter module according to claim 16, wherein the imaging surface comprises an array of CMOS sensors.

18. The miniature camera shutter module according to claim 16, wherein the imaging surface comprises an array of charge-coupled devices.

19. The miniature camera shutter module according to claim 1, further comprising:
   a. a miniature camera chassis comprising:
      i. an enclosure with an opening on a first side of the enclosure for allowing light to enter the miniature camera chassis; and
      ii. an imaging surface disposed on a second side of the enclosure, wherein light entering the miniature camera chassis through the opening is directed toward the imaging surface, wherein the opening and the imaging surface are co-axial on a first axis, and wherein the miniature camera shutter module is coupled to the enclosure substantially adjacent to the imaging surface such that a portion of the light passing through the conduit of the module frame falls incident upon the imaging surface, producing a recordable image;
   b. a moving lens package, wherein the lens package directs light from the opening toward the miniature camera shutter module, and wherein the moving package moves on the first axis; and
   c. at least one position sensor coupled to the miniature camera chassis, wherein the at least one position sensor tracks the movement of the moving lens package.

20. The miniature camera shutter module according to claim 19, wherein the conduit is the same size and shape as the imaging surface, such that light passing through the conduit falls incident upon the entire imaging surface.

21. The miniature camera shutter module according to claim 19, wherein the imaging surface comprises an array of CMOS sensors.

22. The miniature camera shutter module according to claim 19, wherein the imaging surface comprises an array of charge-coupled devices.

23. The miniature camera shutter module according to claim 1, further comprising a cover over the module frame.

24. A miniature camera component comprising:
   a. a miniature camera chassis comprising:
      i. an enclosure with an opening on a first side of the enclosure for allowing light to enter the miniature camera chassis; and
      ii. an imaging surface disposed on a second side of the enclosure, wherein light entering the miniature camera chassis through the opening is directed toward the imaging surface, wherein the opening and the imaging surface are co-axial on a first axis;
   b. a moving package comprising:
      i. a miniature camera shutter module comprising:
         (1) a module frame comprising a surface with a conduit passing therethrough;
         (2) a solenoid coupled to the module frame;
         (3) a pin coupled to the solenoid;
         (4) an axle coupled to the module frame;
         (5) at least one blade coupled to the pin and the axle, wherein the at least one blade is substantially disposed in the same plane as the module frame, wherein the solenoid is configured to receive a first electric signal for actuating the solenoid, and wherein the at least one blade is configured such that the actuation of the solenoid causes the pin to move, causing the at least one blade to rotate about the axle and at least partially eclipse the conduit; and
         (6) at least one ancillary blade coupled to the module frame, wherein the module frame is positioned between the at least one blade and the at least one ancillary blade; and
      ii. a lens package, wherein the lens package directs light from the opening toward the miniature camera shutter module, wherein at least a portion of the light passes through the conduit of the module frame, and wherein the moving package moves on the first axle;
   c. a focusing lens, wherein the portion of light that passes through the conduit of the module frame is focused onto the imaging surface, producing a recordable image; and
   d. at least one position sensor coupled to the miniature camera chassis, wherein the at least one position sensor tracks the movement of the moving package.

25. The miniature camera component according to claim 24, the miniature camera shutter module further comprising a channel consisting of a channel in the module frame, wherein the pin passes through the at least one blade and at least partially extends into the channel such that, as the solenoid actuates the pin, the pin moves within the channel.

26. The miniature camera component according to claim 24, the miniature camera shutter module further comprising:
   a. at least one ancillary solenoid coupled to the module frame;
   b. at least one ancillary pin coupled to the at least one ancillary solenoid; and
   c. at least one ancillary axle coupled to the module frame, wherein the at least one ancillary blade is coupled to the at least one ancillary pin and to the at least one ancillary axle, wherein the at least one ancillary blade is substantially disposed in the same plane as the module frame, wherein the at least one ancillary solenoid is configured to receive a second electrical signal, wherein the second electric signal actuates the at least one ancillary solenoid, wherein actuation of the at least one ancillary solenoid causes the at least one ancillary pin to move, causing the at least one ancillary blade to at least partially eclipse the conduit.

27. The miniature camera component according to claim 24, the miniature camera shutter module further comprising a cover over the module frame.

28. A method of manufacturing a miniature camera shutter module comprising:
   a. providing a miniature camera chassis comprising:
      i. an opening for light to enter the miniature camera chassis;
      ii. a lens package; and
      iii. an imaging surface;
   b. providing a miniature camera shutter module frame, the step comprising:
      i. forming a conduit passing through the miniature module frame such that light is able to pass therethrough;
      ii. coupling at least one solenoid to the module frame;
      iii. coupling at least one blade and at least one ancillary blade to the module frame such that the module frame is positioned between the at least one blade and the at least one ancillary blade; and
      iv. coupling the at least one blade to the at least one solenoid, wherein the at least one solenoid is configured to receive a signal;
   c. positioning the miniature camera shutter module frame between the opening and the imaging surface such that light entering the opening is directed through the conduit to the imaging surface; and
   d. providing the ability to supply a signal to the at least one solenoid, wherein the signal actuates the at least one blade, causing the at least one blade to at least partially eclipse the conduit, and wherein at least one blade alters the light passing through the conduit upon actuation of solenoid.

29. The method of manufacturing a miniature camera shutter module according to claim 28 wherein the at least one blade completely obstructs the light passing through the conduit upon actuation of solenoid.

30. The method of manufacturing a miniature camera shutter module according to claim 28 wherein the at least one blade partially obstructs the light passing through the conduit upon actuation of solenoid.

31. The method of manufacturing a miniature camera shutter module according to claim 28 wherein the at least one blade filters the light passing through the conduit upon actuation of solenoid.

32. The method of manufacturing a miniature camera shutter module according to claim 28 wherein the at least one blade has a substantially rectangular shape to accommodate miniature camera applications having a substantially rectangular imaging surface.

33. The method of manufacturing a miniature camera shutter module according to claim 28, wherein the step of providing a miniature camera shutter module frame further comprises configuring the miniature module frame with a cover.

34. A miniature camera shutter module comprising:
   a. a module frame comprising a surface with a conduit passing therethrough;
   b. a first solenoid coupled to a first side of the module frame and a second solenoid is coupled to a second side of the module frame, and wherein the first solenoid and the second solenoid are substantially co-planar on a plane perpendicular to the plane of the modular frame;

c. a pin coupled to the first solenoid;

d. an axle coupled to the module frame; and e. at least one blade coupled to the pin and the axle, wherein the at least one blade is substantially disposed in the same plane as the module frame, wherein the first solenoid is configured to receive a first electric signal for actuating the first solenoid, and wherein the at least one blade is configured such that the actuation of the first solenoid causes the pin to move, causing the at least one blade to rotate about the axle and at least partially eclipse the conduit.

* * * * *